Dec. 15, 1925.  1,565,626
W. D. DOREMUS
COTTON GIN
Filed Sept. 8, 1920
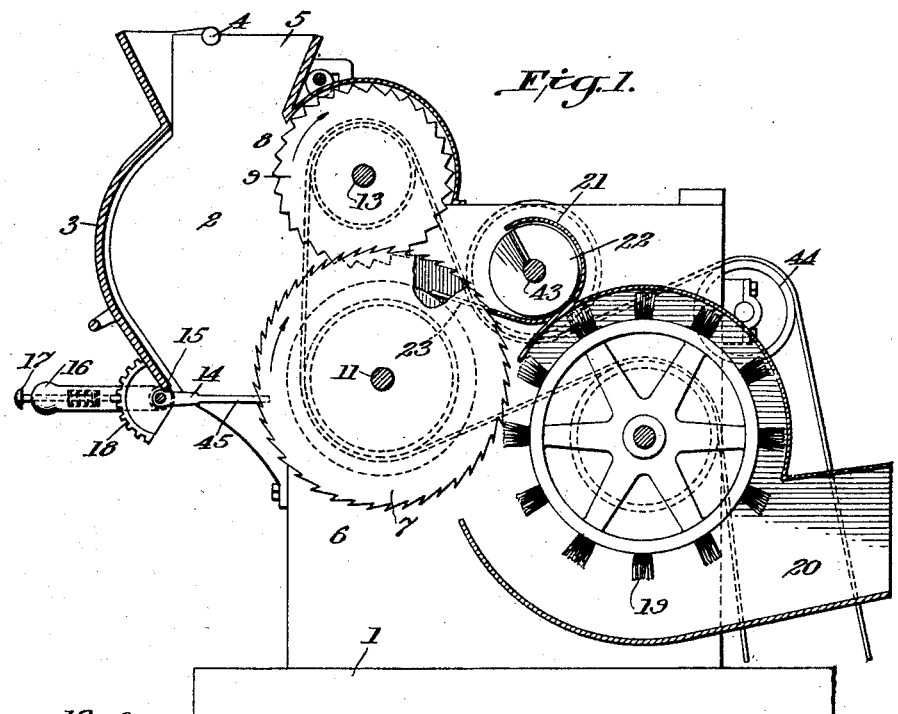
Fig. 1.
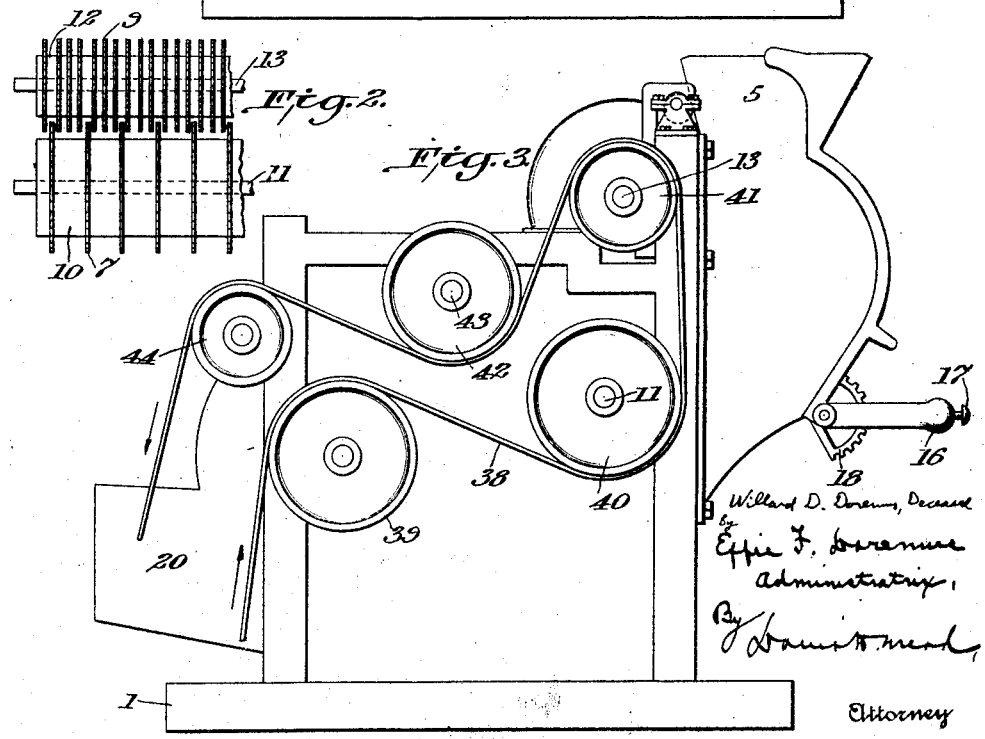
Fig. 2.
Fig. 3.
Willard D. Doremus, Deceased
by
Effie F. Doremus
Administratrix,
By
Attorney Patented Dec. 15, 1925.

1,565,626

UNITED STATES PATENT OFFICE.

WILLARD D. DOREMUS, DECEASED, LATE OF WASHINGTON, DISTRICT OF COLUMBIA; BY EFFIE F. DOREMUS, ADMINISTRATRIX, OF WASHINGTON, DISTRICT OF COLUMBIA, ASSIGNOR TO THOMAS MORTON GITTINGS, TRUSTEE, OF WASHINGTON, DISTRICT OF COLUMBIA.

COTTON GIN.

Application filed September 8, 1920. Serial No. 409,018.

*To all whom it may concern:*

Be it known that WILLARD D. DOREMUS, deceased, a citizen of the United States, late of Washington, in the District of Columbia, did invent certain new and useful Improvements in Cotton Gins, of which the following is a specification.

This invention relates to cotton gins.

The object of the invention is to provide a cotton gin which shall be free from the objectionable feature of the rigid rib employed in the Whitney type of gin wherein seed cotton engaged by saws is, in the act of ginning, brought violently into contact with such rib with resultant injury to a large percentage of the fiber and seed operated upon.

With this object in view, the invention consists of a cotton gin having the generic and specific features of construction and arrangement of parts substantially as hereinafter described and claimed.

The invention is illustrated in the accompanying drawing, in which:

Figure 1 is a vertical sectional view of a cotton gin constructed in accordance with my invention;

Figure 2 is a fragmentary view, showing the relative arrangement of the parts of two ginning members;

Figure 3 is a side view of a portion of the gin, particularly showing the means for driving the operative parts.

In this drawing 1 represents the frame of the machine in the upper portion of which, at one side, is located a breast 2, having the outer face thereof composed of a board or plate 3 detachably secured to the ends of the casing of the machine in any suitable way; for instance, by arms 4, resting in sockets in the ends of the casing of the breast. The inner face of the breast formed by the plate or board 3 is preferably curved, as shown in order to conform to the general form of a roll of seed cotton formed in the operation of the gin, in the breast. Located at the upper end of the breast is a hopper 5 through which seed cotton to be ginned is introduced into the machine from a feeder or otherwise.

The ginning instrumentalities employed are arranged to form the side of the breast of the gin opposite the plate or board 3 and in accordance with my improvement consists of one or more cylinders 6 incorporating gin saws 7, and a cylinder 8 composed principally of disks 9 having toothed peripheries arranged above the saw cylinder, the cylinders being so mounted and arranged in relation to each other that the saws and disks of the respective members overlap.

The saws 7 are preferably separated a distance apart by means of space blocks 10 interposed between them and located on the shaft 11 of the cylinder, to permit the passage between them of seed which has been freed from fiber.

The cylinder 8 is composed of the toothed disks 9 and space blocks 12, mounted on a shaft 13. The number of the toothed disks employed in the embodiment of the invention herein shown is in excess of that of the saws on the cylinder 6, and the members of the respective cylinders are so arranged in respect to each other that each saw extends between two of the toothed disks when the parts are assembled.

In the form of cylinders herein shown the number of toothed plates on the upper cylinder is three times that of the number of saws employed on the lower cylinder. The cylinders are driven by suitable means, such, for instance, as that hereinafter described, to cause them to rotate in the direction indicated by the arrows in Figure 1, the toothed disks preferably having a greater peripheral speed than the gin saws, in order that each tooth of the disks 9 may be caused to coact with a tooth of a saw 7.

In the operation of the machine seed cotton introduced into the hopper is engaged by the teeth of the saws 7 and by them is carried to the point of intersection of such saws with the toothed disks 9. When seed cotton so engaged reaches a point to be acted upon by members of both cylinders, it is subjected to a combing action between them. The spaces between the toothed disks is sufficient to permit the free passage between them of fiber which is engaged by the teeth of the saws, but is too small to permit the passage between them of seed. The result is that seed is removed from the fiber and falls between the saws or into the breast of the gin. The seed and fiber are separated in a manner corresponding to the action of the hands with the result that the fiber and seed are preserved in their natural condition.

The peripheries of the disks 9 are toothed and are preferably provided with teeth which are angular in general contour. The height of the teeth, as illustrated by the drawing, is substantially the same as that of the teeth of the gin saws. In order to avoid possibility of carrying seed cotton engaged by these teeth over the cylinder formed by the disks, such teeth are preferably, as shown in the drawing, formed with those sides which are forward in respect of the movement of the disks longer and of a less abrupt incline than those of the opposite sides. The result is that seed cotton and seed not engaged by the saw teeth coming into contact with the teeth of the disks are not engaged by the disk teeth, but are thrown from them by centrifugal force into the breast.

Seed cotton introduced into the gin and which is not engaged by the teeth of the saws is formed into a roll in the breast, and the roll is constantly kept in motion by the contact therewith of the rotating saws and disks of the respective cylinders. The roll so formed is composed of seed cotton which does not become packed and is, therefore, readily engaged by the teeth of the saws when the latter come into contact with it.

A portion of the seed separated from the fiber in the ginning operations falls by gravity into the breast of the gin and escapes from the lower end thereof. The seed outlet opening may be regulated by a plate 14 having projecting from it the teeth 45, which when in a horizontal position extend between the saws of the cylinder 6. The plate is pivotally mounted on a rod 15 on the lower end of the breast and has attached to it a lever 16 carrying a spring operated rod 17 which engages the teeth of a segment 18 in order to retain the plate in any position to which it may be moved. The space between the teeth is sufficient only to allow the escape between them of clean seed. The depressing of the inner end of the plate having the teeth increases the seed opening, while the upward movement thereof decreases the size of the opening, in order to govern the outlet of seed, and thereby prevent the escape of seed having more than the desired quantity of fiber adhering thereto.

Fiber engaged by the teeth of the saws freed from seed by the coaction of the saws and the toothed disks 9 is removed from the saws by means of the doffing brush 19 and by it is thrown through a conduit 20 to a compress or place of storage. Interposed between the point of ginning and the doffing brush, adjacent to the path of movement of the ginned fiber carried by the gin saws is a casing 21 extending across the gin and having an opening therein adjacent to the upper portions of the saws. The casing is located in such relation to the saws that dust, dirt or other heavy foreign substance carried by the lint on the saws is thrown therefrom by centrifugal force into the casing. The casing has arranged in it a screw conveyor 22 by which such foreign substance and seed passing between the saws in the direction of the doffing brush are removed from the machine. The lower portion of the casing 21 has extending from it fingers 23 which project between the saws 7 and rest upon the space blocks 10. These fingers serve to convey seed freed from fiber and falling upon the space blocks into the casing 21, from which they are removed by the screw conveyor.

Motion is imparted to the working parts of the gin in any suitable way. In the present embodiment of the invention I have shown a driving means which consists of a belt 38 suitably driven by means preferably located below the gin. The belt passes over a pulley 39 attached to the shaft of the brush 19, thence under a pulley 40 attached to the shaft 11 of the cylinder 6, and from this upward and over a pulley 41 secured to the shaft 13 of the cylinder 8. The belt then passes outward and over the lower face of a pulley 42 secured to the shaft 43 of the screw conveyor 22, and from there over an idle pulley 44 and thence back to the source of power.

While I have herein shown one saw cylinder combined with a cylinder composed of toothed disks, it will be clear from an understanding of the invention that two or more saw cylinders having their members overlapping in order to coact in the ginning operation may be combined and having arranged adjacent to the last saw cylinder a cylinder composed of disks of the character described which, while coacting with such last cylinder to separate seed from fiber, does not tend to carry seed or seed cotton over it, but, on the contrary, to throw it into the breast, thus allowing unginned seed cotton to be formed into a roll to be presented to the action of the saw cylinders.

I claim:

1. A cotton gin comprising a cylinder composed of gin saws, and a cylinder composed of disks provided with peripheral teeth each having a single projecting angle with straight sides, the teeth being of a form rendering them free from hooking action on fibre, and the cylinders being so arranged that the saws and disks overlap.

2. In a cotton gin, a cylinder comprising gin saws, and a cylinder comprising disks having teeth in the form of obtuse angles on their peripheries, the cylinders being so arranged that the saws and disks overlap.

3. In a cotton gin, a cylinder comprising gin saws, and a cylinder comprising disks having angular teeth on their peripheries, the cylinders being rotatable in the same directions and so arranged that the saws and disks overlap, the forward sides of the teeth on the disks in respect of their direction of movement being of less abrupt incline than the opposite sides thereof.

In testimony whereof, I affix my signature.

EFFIE F. DOREMUS.